UNITED STATES PATENT OFFICE.

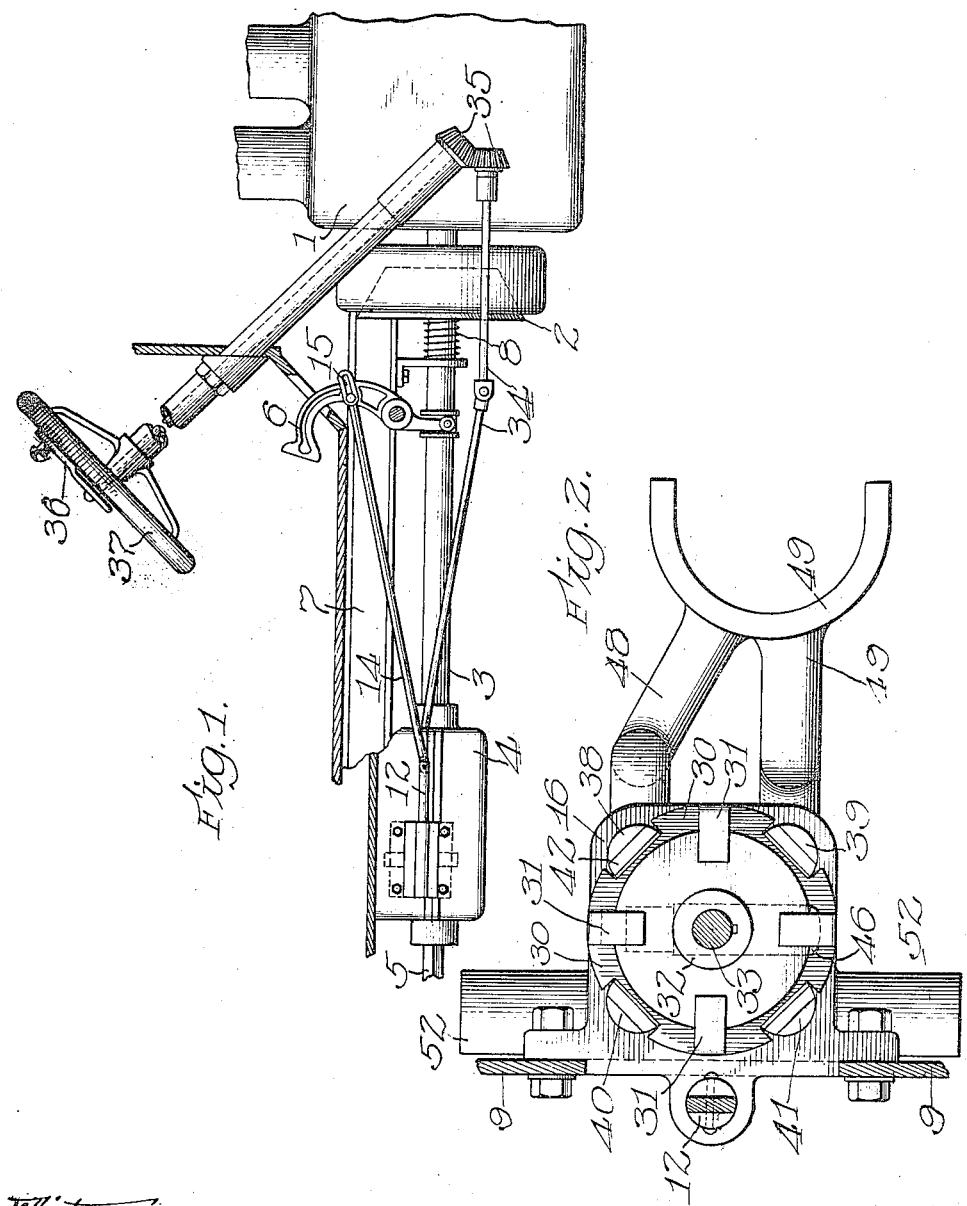

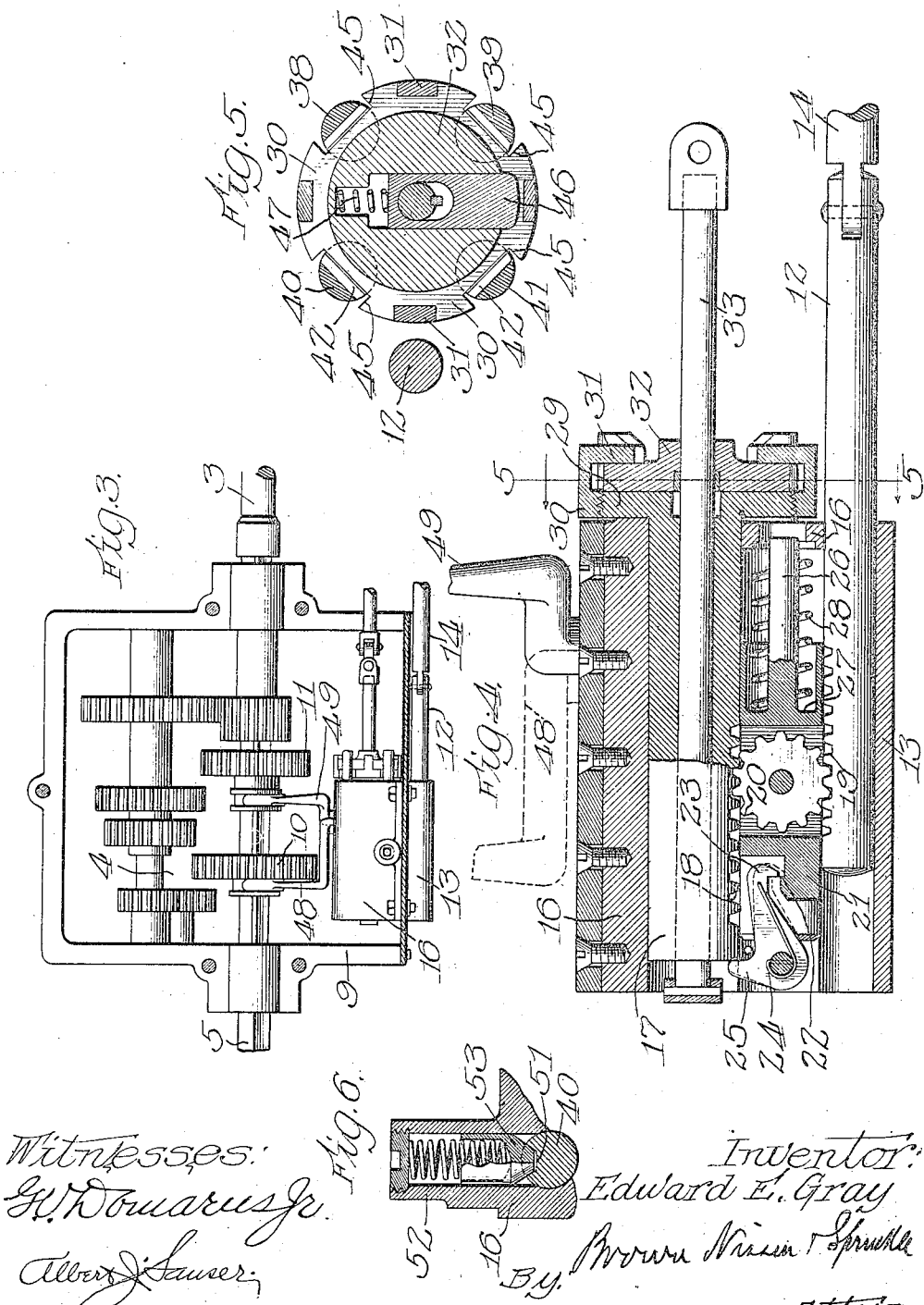

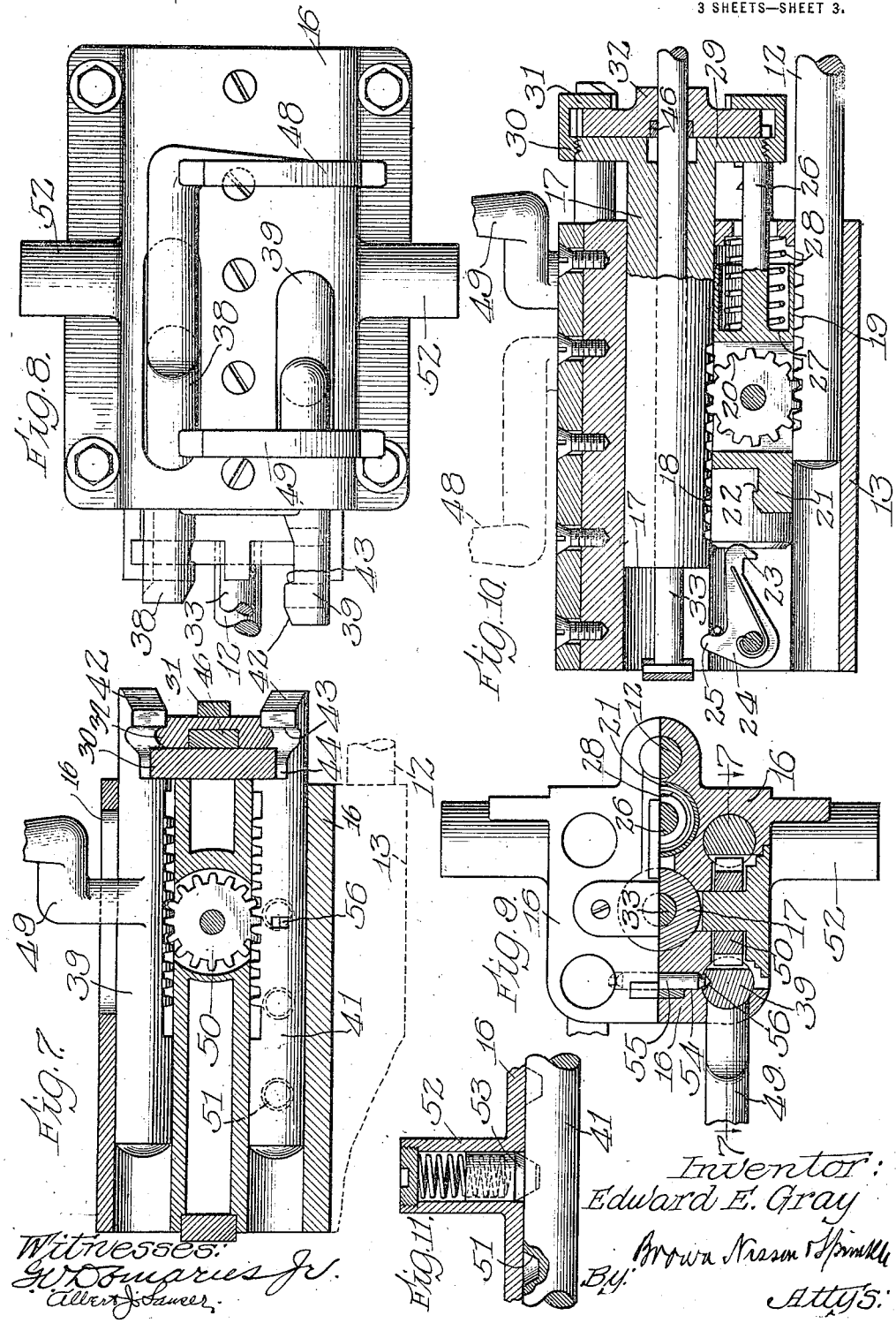

EDWARD E. GRAY, OF PLANO, ILLINOIS, ASSIGNOR TO GRAY PNEUMATIC GEAR SHIFT COMPANY, A CORPORATION OF ILLINOIS.

GEAR-SHIFTING MECHANISM.

1,266,585.      Specification of Letters Patent.      Patented May 21, 1918.

Application filed November 21, 1914. Serial No. 873,271.

*To all whom it may concern:*

Be it known that I, EDWARD E. GRAY, a citizen of the United States, residing at Plano, in the county of Kendall, in the State of Illinois, have invented certain new and useful Improvements in Gear-Shifting Mechanism, of which the following is a specification.

This invention relates to change gear mechanism for automobiles, and the like, and especially those types which are operated by mechanical means.

The purpose of the invention is to provide a mechanism by means of which any desired gear may be selected for subsequent operation, and placed in operation by the forward and backward movement of an operating member, usually the clutch pedal.

For the attainment of these ends, and the accomplishment of other new and useful objects, as will appear, the invention consists in the features of novelty in the construction, combination and arrangement of the several parts generally shown in the accompanying drawings, and described in the specification, but more particularly pointed out in the appended claims.

In the drawings, Figure 1 illustrates the invention as applied to the operating mechanism of an automobile; Fig. 2 is a front elevation of a gear-changing device proper; Fig. 3 is a view of the gear-changing mechanism as applied to the transmission gears; Fig. 4 is a sectional view of the gear-changing mechanism; Fig. 5 is a sectional view taken on the line 5—5 of Fig. 4; Fig. 6 is a detail view of one of the shifting rod holding members; Fig. 7 is a sectional view on the line 7—7 of Fig. 9; Fig. 8 is a side elevation of the gear shifting mechanism; Fig. 9 is a rear view of the mechanism, with some of the parts shown in section; Fig. 10 is a sectional view similar to Fig. 4, showing some of the parts in changed position; and Fig. 11 is another detail view of one of the shifting rod holders.

Generally speaking, the clutch pedal is connected by means of a lost motion connection with a member which operates a plunger for engaging an operating member which slides on a selecting spindle rotated by a selecting and indicating mechanism, the operating member being moved first in one direction and then in the other when the clutch pedal is pressed forwardly.

Referring more particularly to the drawings, an engine 1 is connected by means of a clutch 2 with a transmission shaft 3, and by means of a transmission mechanism designated generally by the reference numeral 4 with a drive shaft 5. A clutch pedal 6 pivoted to a frame 7 operates the clutch by compressing a clutch spring 8 in a well-known manner.

The transmission 4 comprises a casing 9 in which are shiftable gears 10 and 11 for effecting change speed connections between the transmission shaft 3 and the driving shaft 5 in the well-known manner, and disposed within the transmission casing is a gear shifting device which constitutes the subject-matter of the present invention.

This gear shifting device is secured to one side of the casing 9 and preferably comprises a portion 13 which projects through an opening in the casing, and in which projection is mounted a shaft 12 connected to one end of a rod 14 which has a slotted link 15 at its other end connected to the pedal 6.

Within the transmission casing, the gear shifting device is provided with a housing 16 which contains an operating member 17 longitudinally movable in a direction parallel to the shaft 12. The operating member 17 is provided with a rack 18, and the shaft 12 with a rack 19, which are connected by means of a pinion 20 mounted for free rotation in a longitudinally movable plunger 21. This plunger 21 is provided at one end with a catch 22 for sliding under and engaging a hook 23 at one end of a spring-pressed latch 24 pivoted in the housing 16 and having a projection 25 which is adapted to be engaged by the operating member 17 at one end of its travel for moving the latch out of engagement with the catch 22. At the other end the plunger 21 is formed with a stem 26, about which is a recess 27 for seating one end of a spring 28, the other end of which bears against the housing 16, thereby tending to press the plunger in engagement with the latch 25.

At the end adjacent to the stem 26 the operating member 17 is formed with an enlargement 29, which is engaged by the stem in its forward movement, but between the enlarged portion 29 and the end of the stem is a space so that a certain amount of lost motion must be taken up before the stem engages the enlargement 29 of the operating member to move it forward. Secured to the outer edge of the enlarged portion 29 of the operating member, is a member 30 with over-hanging spaced hooks 31, which provides a means for retaining a selecting member 32 between the hooks and the operating member.

Extending through the operating member 17, and through the selecting member 32, is a rotatable selecting spindle 33. The selecting member 32 is keyed to the spindle 33 for rotation therewith, but is freely movable longitudinally of the spindle with the operating member 17. The selecting spindle 33 is connected by means of rods 34, gears 35, and other suitable connections, with an operating arm 36, preferably located at the upper end of a steering wheel 37, and movable over a suitable indicator (not shown) at the top of the steering wheel. By rotating the arm 36, the spindle 33 may be set in any desired position.

Disposed in the housing 16 about the operating member 17 are gear shifting rods 38, 39, 40 and 41. Each rod is formed with a beveled outer face 42, an engaging notch 43, and a shoulder 44 adapted to be engaged by the projecting portion 29 or the member 30 secured to the member 17 when the operating member is moved rearwardly. The notched portion of each rod extends through a recess 45 in the edge of the member 30 between the over-hanging portions 31, and slidable in the selecting member 32 is an engaging dog 46, which is pressed yieldingly into position to engage any one of the rods by means of a spring 47.

Secured to one of the rods 38 is a yoke 48 for moving one of the shiftable gears 10 and secured to another rod 39 is a yoke 49 for moving the other shiftable gear 11. The housing 16 of the gear shifting device is provided with suitable lateral slots for permitting the movement of either rod 38 and 39 in both directions from a neutral position, thereby permitting each gear to be shifted in both directions from a neutral position. Each of the rods 38 and 39 is connected with the rods 40 and 41 respectively by means of a pinion 50 mounted in the housing 16, and engaging a suitable rack formed in each of the rods. With this construction, the movement of the operating member 17 in the forward direction will move either one of the rods 38 or 39 in the forward direction by the direct engagement of the dog 46 with the notch of these rods, or will move the rods in the reverse direction by the engagement of the dog 46 with either of the rods 40 or 41. In this manner the rods 38 and 39, and consequently the gears 10 and 11, may be shifted in either direction from a neutral position.

For accurately positioning the gear shifting rods, the rods 40 and 41 are formed with recesses 51 corresponding to the several positions of each rod, and the housing 16 is formed with hollow projections 52, in which are spring pressed holders 53 adapted to engage in the recesses for holding the rods releasably but firmly in any particular position. For locking the rods against movement when one of the rods is in operating position, the housing 16 is provided with a hole 54, (see Fig. 9), extending between the bores for the shafts 38 and 39, in which is a locking member 55 with beveled extremities. Each of the rods 38 and 39 is formed with a notch 56 adapted to be engaged by the beveled extremity of the locking member 55 when the bars are in neutral position, and the length of the locking member 55 is the depth of one recess more than the distance between the bores of the rods, so that when one end of the locking member is forced into the recess of one of the rods by the movement of the other rod, the first named rod cannot be moved until the other rod is returned to neutral position.

In operation, the selected dog 46 is first set in position by moving the arm 36 to engage the notch of one of the gear shifting rods, the pedal 6 is pressed forwardly which releases the clutch and takes up the lost motion in the slot 15. If the shiftable gears have previously been in neutral position, the operating member 17 will be in the position shown in Fig. 4 pressing the latch 24 out of engagement with the catch 22; the shaft 12 is then free to move in a forward direction with the pedal until the stem 26 engages the projection of the operating member 17 and moves it forwardly, carrying with it the previously selected gear shifting rod, to the position shown by Fig. 10. The backward movement of the pedal due to the action of the clutch spring simply returns the shaft 12 and the plunger 21 to the position shown by Fig. 4, where the catch is engaged by the hook 23 of the latch 24.

In case it is desired to shift the gears from one operating position to another, the operating member 17 will be in the position shown by Fig. 10, while the plunger will be in engagement with the latch as shown by Fig. 4. At this time, the spindle 33 may be rotated so that the selecting dog 46 will engage any other of the gear shifting rods, and upon the forward movement of pedal 6, the first action, as before, will be to release the clutch and take up the lost motion; the next action will be the forward movement of the shaft 12, and since the pinion 20, carried by the plunger 21, is fixed against forward movement with the shaft 12, the pinion 20 will rotate, moving the operating member 17 in the direction opposite to the movement of the shaft 12, or rearwardly, so that the shoulder 44 of the previously selected gear shifting rod will be engaged by the plunger 17, or by the member 30 secured thereto carrying this previously selected rod backwardly with the operating member 17 until the shoulders 44 of all the rods are in a common plane, whereupon the rear of the operating member will engage the projection 25 of the latch 24, thereby disengaging the latch from the catch 22, and the continued movement of the pedal 6 in the forward direction will then cause the forward movement of the plunger 21, since the pinion 20 is now free to move on the rack 18, and the stem 26 will then engage with the projection of the operating member 17, moving it forward as before, and carrying with it the previously selected gear shifting rod.

The space between the end of stem 26 and the enlargement 29 of the operating member is provided to make less sensitive the action of the foot on the clutch pedal, or, in other words, to eliminate the necessity of the clutch pedal traveling exactly the right distance when returning the parts to neutral. This space, in connection with the action of the holders 53 in the recesses 51 of the gear shifting rods, provides means for insuring that the gears will be moved into a neutral position without necessitating that the pedal be moved the exact distance since the operating member 17 may be free from the stem 26 and in neutral position without moving the plunger 21 entirely back to the position in which it will be engaged by the latch 24.

With this construction, it is obvious that the mechanism can be set for subsequent operation while in operating position for any speed, so that by the mere forward and backward movement of the pedal, the selected change may be effected, and the gear shifting rods accurately positioned and locked against the improper movement of any of the other rods.

I claim:

1. Gear shifting mechanism comprising movable rods for shifting the gears, a member for selectively engaging and moving the rods, another member movable parallel with the first member, and means comprising a pinion connecting the two members and movable in a direction parallel thereto for first moving the selecting member in one direction and for engaging the selecting member for movement in the opposite direction while the other member is movable in a single direction.

2. Gear shifting mechanism comprising shiftable gears, rods for shifting the gears, a member for selectively engaging and moving the rods, a longitudinal movable member, and an intermediate movable member carrying a pinion for connecting the other two members and for engaging one of the members whereby the movement of one of the members in a single direction will first move the other member in the opposite direction and will then engage the other member and move it in the same direction.

3. Gear shifting mechanism comprising shiftable gears, rods for moving the gears, an operating member for selectively engaging and moving the rods, a member movable parallel with the first named member, an intermediate member with a pinion to engage the other two members and adapted to engage one of the members, and a latch to engage the intermediate member and released from such engagement by the selecting member at one end of its stroke whereby the movement of the said parallel moving member in a single direction will operate first to move the selecting member in the opposite direction until the latch is released, and will then move the intermediate member in a direction to engage the selecting member and move all of the members in the same direction.

4. Gear shifting mechanism comprising shiftable gears and rods for moving the gears, a member for selecting and engaging any one of the gear shifting rods, a shaft movable parallel with the member, an intermediate movable member having a pinion engaging both the shaft and the selecting member, and having a stem to engage the selecting member in one direction of movement, a fixed latch for engaging the intermediate movable member adapted to be released from such engagement by the backward movement of the selecting member whereby the movement of the shaft in the forward direction will first move the selecting member backwardly to release the latch and will then cause the intermediate member to be moved forward so that the stem engages the selecting member, whereupon the shaft, the intermediate member and the selecting member will be moved forward carrying with them a previously selected gear shifting rod.

5. In gear shifting mechanism the combination with gears shiftable in both directions from a neutral position, of means for engaging and shifting the gears comprising shiftable rods, a selecting member for engaging one of the rods, a shaft movable parallel with the member, an intermediate member having a pinion to form a driving connection between the shaft and a stem adapted to engage the selecting member but spaced therefrom, a fixed latch adapted to engage the intermediate member in its neutral position and adapted to be released by the selecting member, some of the gear shifting rods being provided with apertures corresponding to the different positions of the gears, and a spring pressed holder for engaging in the recesses, and a spring tending to return the intermediate member to its neutral position whereby the rods will be returned to neutral position and engaged by the holders in said position.

6. Gear shifting mechanism comprising shiftable gears, of a means comprising rods for moving them, an operating and selecting member for the rods, a shaft movable parallel with the operating member, means for connecting the member and the shaft to move the member first in one direction and then in the other by the movement of the shaft in one direction, some of the rods being provided with recesses corresponding to the different positions of the gears, and spring pressed holders to engage in the recesses for holding the rods releasably in any selected position.

7. Gear shifting mechanism comprising shiftable gears, means comprising rods for moving the gears, an operating and selecting member for the rods, a shaft movable parallel to the operating member, means connecting the shaft and the member and for engaging the member whereby the movement of the shaft in one direction will first move the operating member in the opposite direction and then in the same direction, and a locking device for preventing the movement of one of the gear shifting rods when another is in shifted position.

8. Gear shifting mechanism comprising shiftable gears, rods for shifting the gears, an operating member having spaced hooks at one end, a selecting member disposed between the hooks and the member and freely rotatable therebetween, means in connection with the selecting member for engaging any one of the rods, rotating means for the selector, and means for operating the member by moving it first in a direction to return a previously selected rod to neutral position, and then to move the member in the opposite direction to operate a selecting rod.

9. In gear shifting mechanism, the combination with a casing of transmission gears therein, some of which are shiftable, the gear shifting device comprising a housing disposed within the casing, and having a part projecting through an opening in the casing, means for shifting the gears comprising shiftable rods, an operating member for moving the rods, a shaft movable in the projection of the device outside of the casing, and means forming a driving connection between the shaft and the member for moving the member first in one direction and then engaging the member for moving it in the same direction as the shaft.

10. Gear shifting mechanism comprising shiftable gears, movable rods for shifting the gears, an operating member for moving the rods, a shaft movable parallel to the member, means for connecting the shaft to the member, said means comprising a portion for positively engaging the member in one direction of movement of the shaft, an operating member for the shaft, and a rod connected at one end to the shaft and having a lost motion connection with the shaft operating member, whereby the shaft operating member must be moved a predetermined distance before the shaft is moved with it.

11. In gear shifting mechanism, the combination with transmission gearing comprising shiftable gears, of a driving engine therefor, a clutch to connect the engine with the transmission mechanism, rods for moving the gears, an operating member for moving the rods, a shaft, means connecting the member and the shaft for moving the member first in one direction and then in the other while the shaft is moving but once in a single direction, a pedal for operating the clutch, and a lost motion connection between the pedal and the shaft whereby the clutch is first operated, and then the lost motion is taken up, and the shaft operated by the movement of the pedal in one direction.

12. In gear shifting mechanism, means for selectively engaging and shifting the gears, a reciprocable operated member, and mechanism connecting the means and said member operative to first move the said means in one direction and for engaging the said means for movement in the opposite direction while the said operating member is movable in a single direction.

13. In gear shifting mechanism; a gear selector and shifter, an actuating member, and an intermediate member, all reciprocably movable; means carried by the intermediate member for connecting the other two members; and a fixed latch for engaging the intermediate member to prevent its movement until the gear shifter is moved to one end of its movement releasing the latch.

In testimony whereof I have signed my name to this specification, in the presence of two subscribing witnesses, on this 17th day of November, A. D. 1914.

EDWARD E. GRAY.

Witnesses:
KENT W. WONNELL,
CHARLES H. SEEM.